United States Patent
Heck

(10) Patent No.: US 8,989,857 B2
(45) Date of Patent: Mar. 24, 2015

(54) CONTROL SYSTEM AND APPARATUS UTILIZING SIGNALS ORIGINATING IN THE PERIAURICULAR NEUROMUSCULAR SYSTEM

(76) Inventor: Sandy L. Heck, New York, NY (US)

( * ) Notice: Subject to any disclaimer, the term of this patent is extended or adjusted under 35 U.S.C. 154(b) by 113 days.

(21) Appl. No.: 13/295,446

(22) Filed: Nov. 14, 2011

(65) Prior Publication Data
US 2012/0149467 A1    Jun. 14, 2012

Related U.S. Application Data

(60) Provisional application No. 61/413,661, filed on Nov. 15, 2010.

(51) Int. Cl.
- *A61B 5/04* (2006.01)
- *A61B 5/05* (2006.01)
- *A63F 13/20* (2014.01)

(52) U.S. Cl.
CPC ......... *A63F 13/06* (2013.01); *A63F 2300/1012* (2013.01); *A63F 2300/1031* (2013.01)
USPC ........... 600/546; 600/383; 600/547; 600/595; 463/36

(58) Field of Classification Search
USPC .............. 463/36–39; 600/595, 383, 544–547; 340/573.1; 623/25; 341/21
See application file for complete search history.

(56) References Cited

U.S. PATENT DOCUMENTS

| | | |
|---|---|---|
| 4,155,353 A | 5/1979 | Rea |
| 4,291,705 A | 9/1981 | Severinghaus |
| 4,387,723 A | 6/1983 | Atlee, III |
| 4,556,214 A | 12/1985 | Petrofsky |
| 4,590,946 A | 5/1986 | Loeb |
| 4,703,755 A | 11/1987 | Tanagho |
| 4,712,558 A | 12/1987 | Kidd |
| 4,771,779 A | 9/1988 | Tanagho |
| 4,817,628 A | 4/1989 | Zealear |
| 5,024,235 A * | 6/1991 | Ayers ........................... 600/545 |

(Continued)

FOREIGN PATENT DOCUMENTS

| | | |
|---|---|---|
| EP | 0 468 340 A2 | 7/1991 |
| EP | 1 779 820 A2 | 10/2006 |
| WO | WO 2004034937 A1 * | 4/2004 |

OTHER PUBLICATIONS

Vernon, Scott, et al, Brain-Muscle-Computer Interface: Mobile-Phone Prototype Development and Testing, Copyright 2011 IEEE.

(Continued)

*Primary Examiner* — Milap Shah
(74) *Attorney, Agent, or Firm* — James V. Harmon; Nikolai & Mersereau, P.A.

(57) ABSTRACT

Loosing the ability to interact with one's environment can be devastating. The invention enables a person to control the real or virtual action or movement of an output device in from one to three dimensions through the use of at least one electrical sensor implanted beneath the skin or as a part of a headset on either one side or on both sides of the person's head in electrical communication with a vestigial periauricular nerve or muscle. Each sensor communicates through a selected channel to transmit information preferably in digital form to an output device designating an action to be taken or the position of a target location for enabling the output device to perform the action or to move toward or to a target location through real or virtual space. At least one and preferably up to four sensors are located on each side of the head.

38 Claims, 8 Drawing Sheets

(56) References Cited

U.S. PATENT DOCUMENTS

| | | | |
|---|---|---|---|
| 5,038,781 | A | 8/1991 | Lynch |
| 5,131,401 | A | 7/1992 | Westenskow |
| 5,178,145 | A | 1/1993 | Rea |
| 5,368,042 | A | 11/1994 | O'Neal et al. |
| 5,540,730 | A | 7/1996 | Terry, Jr. |
| 5,911,218 | A | 6/1999 | DiMarco |
| 5,957,860 | A | 9/1999 | Rodiera Olive |
| 6,214,032 | B1 | 4/2001 | Loeb |
| 6,355,032 | B1 | 3/2002 | Hovda |
| 6,562,034 | B2 | 5/2003 | Edwards |
| 6,636,763 | B1 * | 10/2003 | Junker et al. ............ 600/545 |
| 6,723,698 | B2 | 4/2004 | Rueger |
| 6,839,594 | B2 | 1/2005 | Cohen |
| 6,845,271 | B2 | 1/2005 | Fang |
| 6,990,376 | B2 | 1/2006 | Tanagho |
| 7,122,031 | B2 | 10/2006 | Edwards |
| 7,369,900 | B2 | 5/2008 | Zdravkovic |
| 7,429,267 | B2 | 9/2008 | Smith |
| 7,555,344 | B2 | 6/2009 | Maschino |
| 7,593,776 | B2 | 9/2009 | Loeb |
| 7,628,750 | B2 | 12/2009 | Cohen |
| 7,636,602 | B2 | 12/2009 | Baru Fassio et al. |
| 7,783,360 | B2 | 8/2010 | Zdravkovic |
| 7,783,363 | B2 | 8/2010 | Zdravkovic |
| 7,805,195 | B2 | 9/2010 | Zealear |
| 2001/0056225 | A1 * | 12/2001 | DeVito ..................... 600/300 |
| 2002/0111557 | A1 * | 8/2002 | Madill et al. ............ 600/546 |
| 2005/0085744 | A1 | 4/2005 | Beverina et al. |
| 2005/0195155 | A1 | 9/2005 | Bonnat et al. |
| 2009/0005700 | A1 * | 1/2009 | Joshi et al. ............... 600/546 |
| 2010/0268125 | A9 * | 10/2010 | Epley ....................... 600/595 |
| 2010/0308999 | A1 * | 12/2010 | Chornenky ............. 340/573.1 |
| 2012/0116537 | A1 * | 5/2012 | Liebetanz ................. 623/25 |

OTHER PUBLICATIONS

Perez-Maldonado, Claudia, et al, Two-Dimensional Cursor-to-Target Control From Single Muscle Site sEMG Signals, IEEE Transactions on Neural Systems and Rehabilitation Engineering, vol. 18, No. 2, Apr. 2010, pp. 203-209, Copyright 2010 IEEE.

Friedman, Richard N., et al., Preliminary Electrophysiological Characterization of Functionality Vestigial Muscles of the Head: Potential for Command Signaling, The Journal of Spinal Cord Medicine, vol. 22, No. 3, Fall 1999, pp. 167-172.

Neurotechnology High Resolution EEG Neuroimaging, EMOTIV Store, EPOC Neuroheadset, http://emotiv.com/store/hardware/epoc-bci/epoc-neuroheadset/, 2 pgs.

Friedman, RN, et al., Preliminary Electrophysiological Characterization of Functionality Vestigial Muscles of the Head: Potential for Command Signaling, J. Spinal Cord Med 2000 Spring: 23(1):54.

International Preliminary Report on Patentability with Notice for corresponding International Application No. PCT/US2012/041447 from the International Bureau of WIPO, dated May 30, 2014, 11 pages.

* cited by examiner

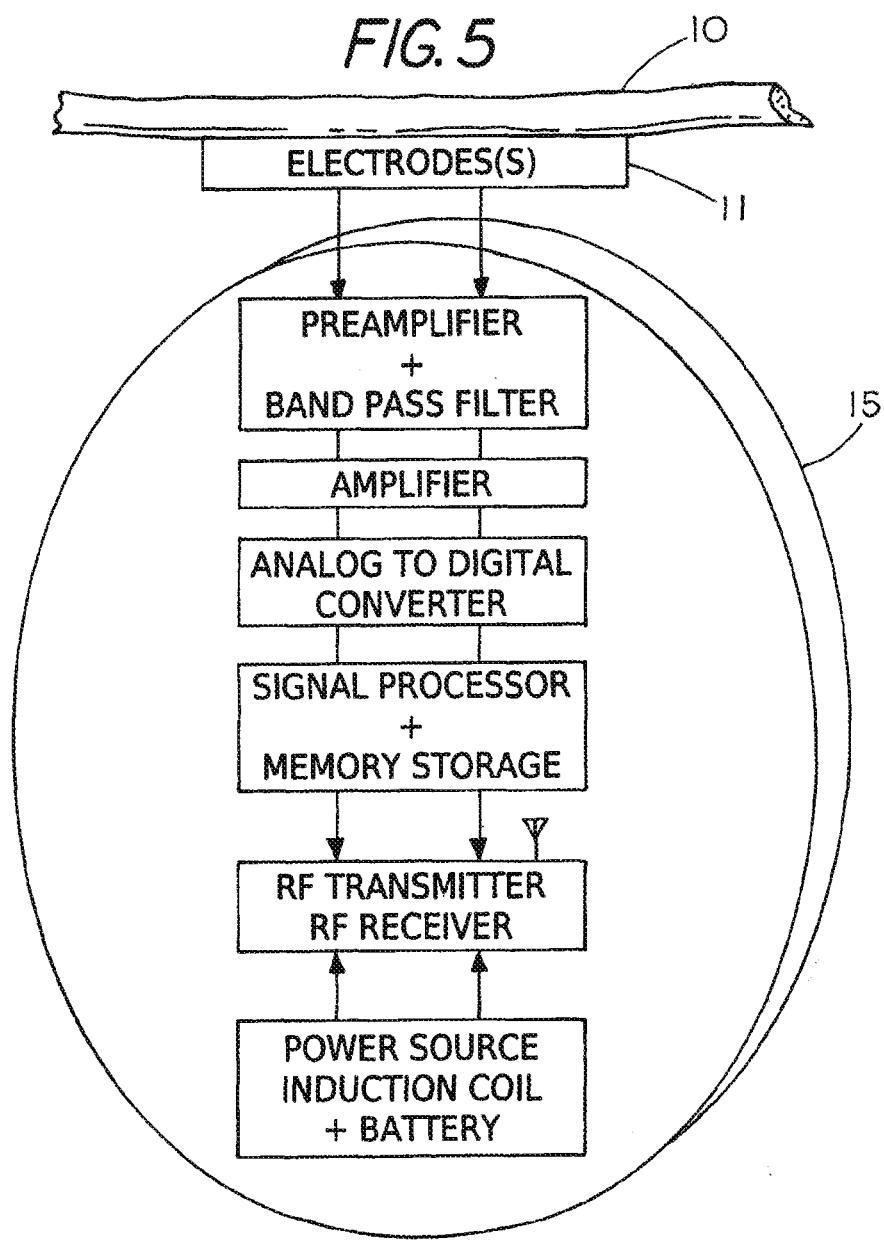

CONTROL SYSTEM AND APPARATUS UTILIZING SIGNALS ORIGINATING IN THE PERIAURICULAR NEUROMUSCULAR SYSTEM

CROSS REFERENCE TO RELATED APPLICATION

The applicant claims the benefit of provisional application Ser. No. 61/413,661, filed Nov. 15, 2010, and entitled "Method and Apparatus for an Implantable Microbionic Control System Using Signals from the Posterior Auricular Nerves and Nerves Innervating the Peri-auricular Muscles", the contents of which are hereby incorporated by reference.

FIELD OF THE INVENTION

This invention generally relates to a control system for enabling a person to actuate an output device and to a method for sensing, receiving or recording actuating signals especially signals from the vestigial nerves and muscles of the periauricular system.

BACKGROUND AND POTENTIAL APPLICATIONS

There is a critical need for assistive devices to aid individuals who have lost their ability, either through injury or disease, to interact with their environment. Hundreds of thousands of individuals in the US and around the world are living with a debilitating spinal cord injury (SCI), and tens of thousands of new cases are occurring each year. These injuries occur in the prime of life for most individuals, and losing of the ability to interact with their environment can be devastating. There is also a need for these assistive devices among individuals with traumatic brain injury (TBI), stroke or other trauma that results in quadriplegia or locked-in syndrome. Additionally, individuals with diseases such as amyotrophic lateral sclerosis (ALS), multiple sclerosis, Lesch Nyhan Syndrome, Parkinson's Disease, cerebral palsy, and even arthritis, have a need for these types of devices.

Many technologies have been developed and implemented to assist these individuals, including "sip and puff" instruments, eye movement tracking, electroencephalogram (EEG) sensors, tongue pressure sensors, and others. These solutions have inherent limitations, particularly that they usurp other body systems, can not be controlled with precision, and require cumbersome external equipment.

While it has been previously proposed e.g. by Joshi et al U.S. pending application Ser. No. 12/163,919 to sense EMG signals from a muscle on the head, Joshi constructs his device to reduce signal interference in order to utilize impulses from a single muscle. The present invention, however, has nothing to do with capturing multiple channels of output from a single muscle. Moreover, the way the electrodes are placed for sensing in the present invention is far different from the teachings of Joshi and includes the placement of electrodes bilaterally as well as in multiple positions on each side of the head to capture bilateral signals for utilizing the vestigial ability of the periauricular nervous system to point in space.

It is one general object of the present invention to provide individuals with a control system that lets them interact with their environment without the limitations inherent in the currently available technologies.

Another more specific object of the invention is to use signals from existing vestigial nerves for controlling an output device without causing harm to the patient due to a loss of the functionality in the nerve that is utilized.

Another object of the invention is to provide a control system of the type described that is minimally invasive and yet fully capable of wide ranging control capability without a deleterious effect to the operation of other sensory or motor systems that may still be uninjured and remain in use by a patient.

Another object of the invention is to provide a system of the type described that can be used by able-bodied persons for a variety of purposes in relation to disability, strength enhancement, sensor enhancement, computer or cursor manipulation, gaming devices, including video games, the operation of other kinds of mechanical devices, such as appliances, vehicles, robotic devices and other equipment in a hands-free manner.

It is still another object of the invention to make possible the sensing of signals derived from the vestigial periauricular nerves or muscles without requiring surgery.

These and other more detailed and specific objects and advantages of the present invention will be better understood by reference to the following figures and detailed description which illustrate by way of example but a few of the various forms of the invention within the scope of the appended claims.

THE DRAWINGS

FIG. 5 is a diagrammatic flow diagram of the circuitry used in FIGS. 3 and 4 to show the implanted electrode-nerve interface.

SUMMARY OF THE INVENTION

Figure 1:
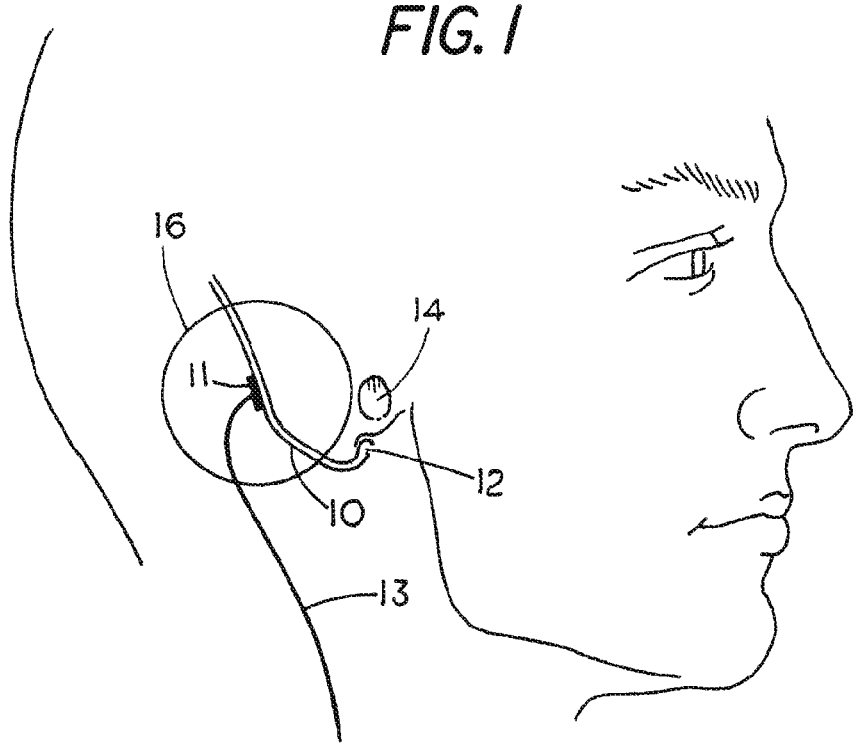
FIG. 1 is a diagrammatic side elevational view of a human patient with the posterior auricular nerve exposed to show the point of attachment of the implanted electrode interface.

The present invention relates to a bilateral biosignal recording and signal transmission system that could be wholly or partially implanted in a human or in the alternative, sensed by a wearable device that is worn on the head of the individual, the output of which can be activated, deactivated or moved toward or to a target or pointed toward a target in from one to three dimensions. In one embodiment, the system is comprised of an implanted element in contact with the posterior auricular nerve and/or periauricular muscles to record the action potentials originating in the nerve. Preferably, such an implant includes sensing electrodes that are in direct contact with the periauricular muscles, thereby supplementing the electroneurogram (ENG) signals recorded by the electrodes on the nerves with EMG signals from the muscles. The recorded signals are transmitted to a signal processing component that amplify them and convert them into digital signals. This digital signal is then transmitted to any suitable electronic receiver, preferably wireless as radio frequency command signals intended to activate, deactivate e.g. turn on or off, or modulate the activity or function of an intended target. In one preferred embodiment, the sensed signals represent a distinct output channel for each distinct periauricular muscle. The system may be implanted or alternatively has sensors comprising surface electrodes worn bilaterally to take advantage of the natural vestigial ability of the periauricular neuromuscular system to "point" the ears at a target. The term "output device" herein means a real or virtual on or of switch or actuator adapted to point or move in from one to three dimensions.

Another aspect of the present invention is the utilization of a multi-muscle vestigial system that evolved bilaterally during vertebrate evolution to "point" hearing in three dimensions for making it possible to identify the direction from which a sound arose. In this way, the invention enables a person to control the real or virtual action or movement of an output device in from one to three dimensions through the use of at least one electrical sensor which can either be implanted beneath the skin or placed on the surface of the skin as a part of a headset on either one side or if more than one sensor is used, on both sides of a person's head in electrical communication with a vestigial periauricular nerve or muscle. Each sensor then communicates through a selected channel to transmit information preferably in digital form to an output device designating an action to be taken or the position of a target location for enabling the output device to perform the action or to move toward or to a target location through real or virtual space. At least one and preferably up to four sensors are located on each side of the head.

The invention also provides a new method for enabling an individual to actuate or control an output device by first placing an electrical sensor on at least one side of the head in electrical communication with a vestigial periauricular nerve or muscle, then using a signal provided by the sensor for transmitting information designating an action to be performed or to move the device toward or to the target in real or virtual space.

DESCRIPTION OF THE PREFERRED EMBODIMENTS

The invention will be more clearly understood by referring to the figures given by way of example which show how bilateral signals from the nerves and muscles of the periauricular system are captured by electrodes according to my invention. Referring Refer now to FIG. 1 which depicts the location and anatomy of the posterior auricular nerve 10. Also shown is the location 12 where the posterior auricular nerve branches off from the facial nerve, where the facial nerve exits the cranium, and where the Posterior Auricular Nerve lies relative to the Ear Canal. The external auditory meatus is designated 14. The preferred location for the signal detecting element is circled at 16. Sensing electrodes 16 are surgically implanted bilaterally in electrically conductive relationship to the posterior auricular nerve as shown in FIGS. 1A, 3, 4, 5, 6 and 7.

Figure 1A:
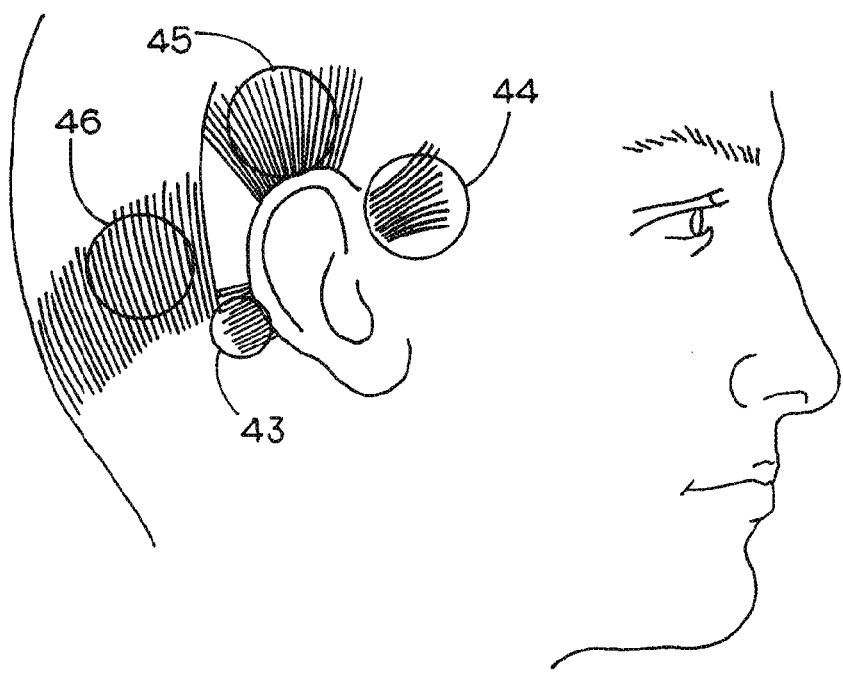
FIG. 1A is a diagrammatic side view of a human head showing the anatomic locations of the periauricular muscles and the locations for EMG electrode placement.
Figure 5A:
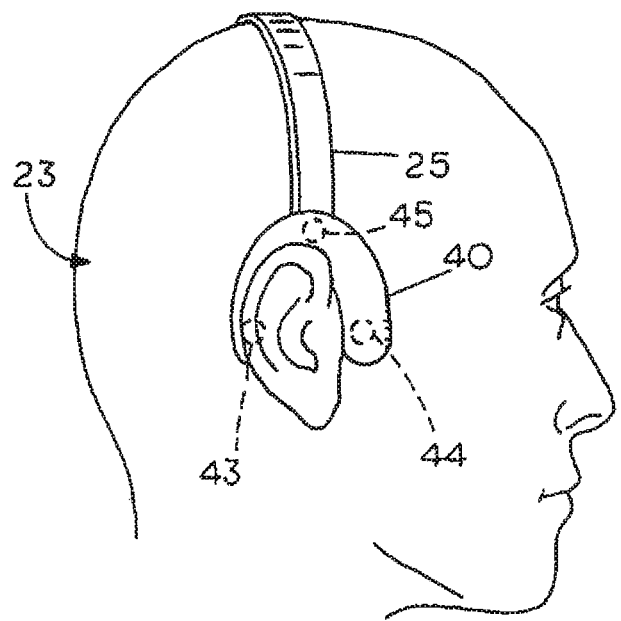
FIG. 5A shows an alternative wearable device that does not require surgical implantation, wherein surface electrodes are held against the head over the auricularis muscles.
Figure 5B:
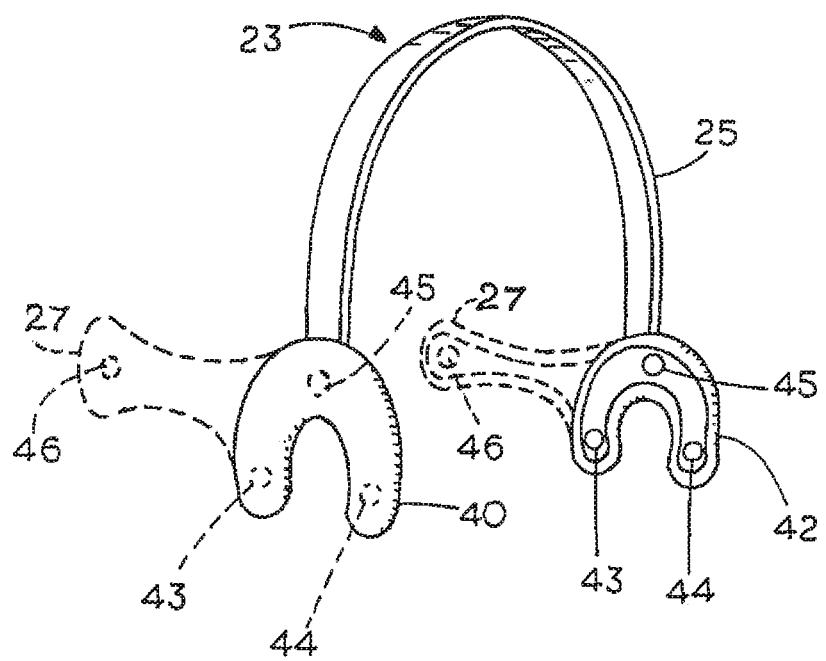
FIG. 5B depicts the relative locations for electrodes on the headset.

FIG. 1A is an anatomical depiction of the periauricular muscles. The preferred locations for surface electrodes placed in electrical contact with the skin are circled. The following discussion will describe the invention with the aid of FIGS. 2, 5, 8 and 8A which show preferred signal flow diagrams, FIGS. 1, 3, 4, 6 and 7 show different ways of implanting the invention, while FIGS. 5A and 5B show ways to wear the invention. Each electrode 11 has a transmission channel so that with one electrode on each side of the head there are two channels, with two electrodes on each side, four channels, and three electrodes on each side, six channels. Depending on the individual's anatomy, the location of the nerve may be varied somewhat to suit the circumstances and it may be preferable to implant the electrode on a different nerve or nerve branch, either in place of or in addition to the posterior auricular nerve that also innervates the muscles around the ear and scalp. Similarly, the exact locations of the periauricular muscles may be different from one individual to the next, and the precise placement of each surface electrode may vary slightly.

The posterior auricular nerves, which are efferent motor nerves arising in the central nervous system (CNS), are part of the vestigial periauricular neuromuscular system that evolved phylogenetically to control the orientation of the ear, in particular the ear pinnae, or ear lobes. These nerves send signals to muscles around the ear and scalp enabling humans and animals to orient their ears towards a sound to better identify and localize noises. This ability remains in many other mammalian species, but it is no longer functionally significant in humans and is therefore considered vestigial. Although these muscles are small and serve no functional purpose today, the muscles and the nerves that innervate them, including the posterior auricular nerves, remain and are present in nearly everyone yet are nevertheless vestigial.

The bilateral use of these nerves and the muscles they innervate according to the present invention as part of a control system presents an opportunity for the disabled. Since these nerves are cranial nerves that exit directly from the brainstem (rather than from the spinal cord), they can and most often do remain undamaged even in the highest cervical spinal injuries. These periauricular nerves and muscles are also not needed for any other purpose, so the individual is able to use them without impairing or complicating the use of other muscle systems, such as the mouth, tongue, eyes, or any other organs normally usurped for this purpose by current commercially available control systems. Since the periauricular muscles are normally not used it was found in developing the present invention that some training is often required to teach the individual how to selectively use them. Training individuals to use these nerves/muscles is similar to training a person to wiggle their ears or scalp.

Another advantage of the posterior auricular nerves and periauricular muscles over other neural signal sources is their superficial anatomic position. While other implantable systems that have been developed can be extremely invasive, such as the brain machine interfaces (BMI) that use signals from intracranially implanted recording electrodes, the posterior auricular nerves 10 lie just a few millimeters beneath the skin behind the ear. These nerves and associated periauricular muscles can be accessed with significantly less morbidity, incisions could be well hidden, and there would be no need to drill through the skull or significantly disrupt the natural anatomy of the body.

As an alternative to the implantable system, the wearable sensors of FIGS. 5A, 5B, 5C and 8A are held against the side of the head to pick up electromyogram (EMG) signals from the superficially located periauricular muscles (including the right and left superior auricularis muscles, posterior auricularis muscles, anterior auricular muscles and occipitalis muscle) as will be described in detail below.

Much of the cumbersome equipment that is currently required for many other control systems is eliminated by the present invention. Other systems that, for example, use tongue, neck, eye or finger movements require cumbersome external equipment to record and track these movements. Such equipment must usually be mounted on or near the individual. In the invention described here, the implanted nerve recording device, processing system and transmitter eliminates the need to maintain external equipment on the body and allows more freedom of movement for the individual. The RF transmitter 2d (FIG. 2) sends the signal using a standard wireless format such as Bluetooth, which is widely compatible with many electronic devices, and could potentially require no extra hardware to make targeted technologies compatible with the implant. The wearable surface EMG sensor is a lightweight system that similarly allows freedom of movement and wireless communication with the target device.

Figure 2:
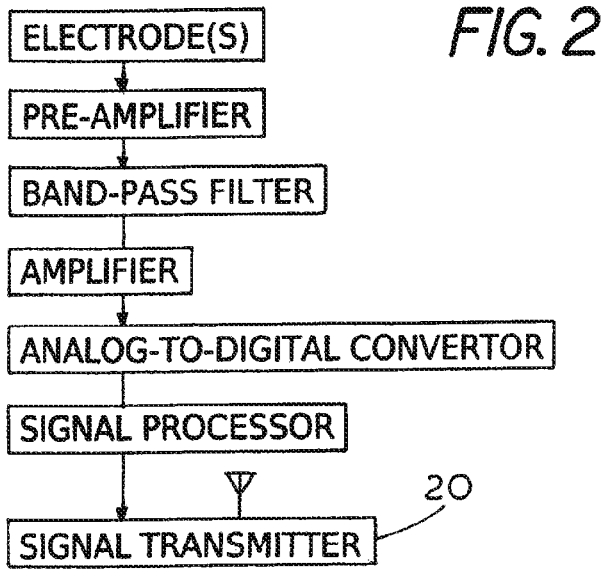
FIG. 2 is a block flow diagram showing one preferred form of signal processing circuitry for an implantable or wearable system.
Figure 2A:
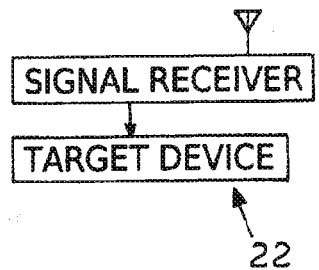
FIG. 2A is a perspective schematic to show how positioning in three dimensions is accomplished by an input device.
Figure 2A:
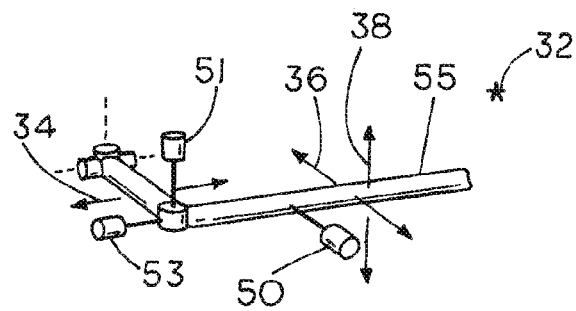
Figure 3:
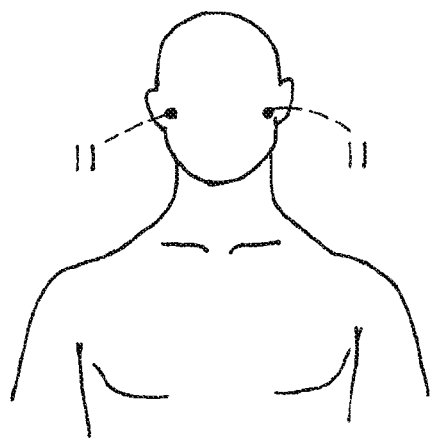
FIGS. 3 and 4 are front and side views, respectively, showing the entire subcutaneous implant secured to the mastoid bone or nearby tissue and coupled by a wire to an electrode that interfaces the nerve.
Figure 4:
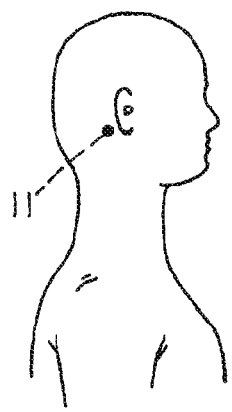

The bilateral control system described by this invention serves as a way to toggle and adjust, e.g. movement of an output target device 22 such as a wheelchair, a cursor or an automatic limb (FIG. 2A) toward a target 32 typically in two dimensional or three dimensional space by applying forces in this case in three dimensions as shown by arrows at 34, 36 and 38 using any suitable power sources such as three electric servomotors 50, 51 and 53 to cause the right-end 55 of the output device of FIG. 2A to mover to or toward the target 32.

The invention works especially well when performing spatially oriented tasks, because the original purpose of these nerves and muscles was to control the directional orientation of the ears towards a target sound or source in a three dimensional environment. Both the implanted and wearable systems are able to control many types of actions including, but not limited to, a cursor on a computer screen (i.e. a virtual "mouse"), a car or motorized wheelchair, video games, computers, stereos, televisions, home appliances and utilities, doors and windows, and other prostheses, by way of example.

The potential uses of this invention are not limited to the disabled, but also include many uses that would be valuable to able-bodied individuals who wish to enhance their abilities. Such uses could include, among other things; the ability to control a variety of prosthesis, implants, mobility aids, strength enhancements or sensory enhancements in a hands-free manner; the ability to manipulate a cursor, computer, or video game system in a hands-free manner or in a manner that allows the user to simultaneously supplement the use of their hands i.e. moving the cursor without needing to stop typing; the ability to manipulate equipment, technologies or appliances in a wireless and hands-free manner; the ability to facilitate work in industrial, military, medical, space or other environments where wireless or hands-free control is beneficial; and any other situation where a "third arm" would be valuable. The implanted sensor element 11 that is placed in contact with the posterior auricular nerve to record signals is preferably in the form of a nerve cuff electrode known in the art, such as one of a tripolar electrode configuration, but the element can be any type of ENG recording electrode interface including sieve electrodes, multielectrode needle arrays, or other conductive material on or in the nerve/nerve fascicules. Insulation around the nerve at the site of the electrode(s) may be included to improve the signal and eliminate interference. Other implanted electrodes 11, in addition to or in place of the electrodes contacting the nerves, can be included to directly contact the muscles and capture the signal after it is amplified by the muscle tissue. Such additional EMG electrodes are preferably in the form of wire or flat disk electrodes.

Figure 5C:
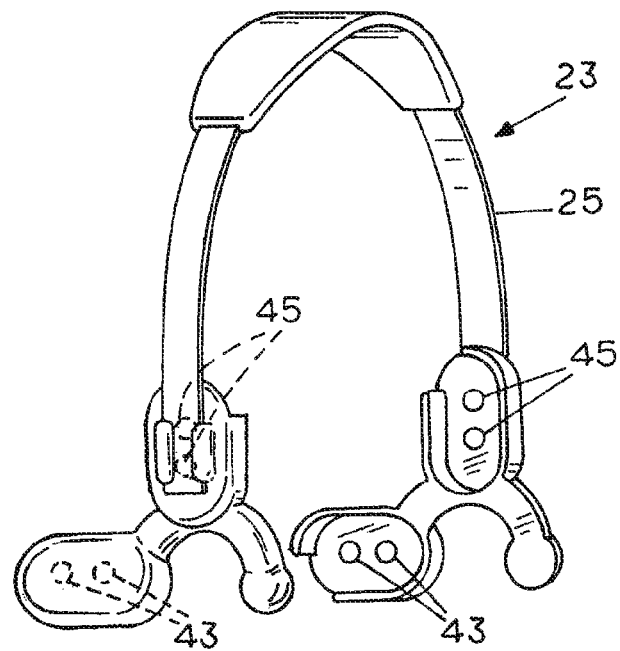
FIG. 5C is a perspective view of another form of headset.
Figure 6:
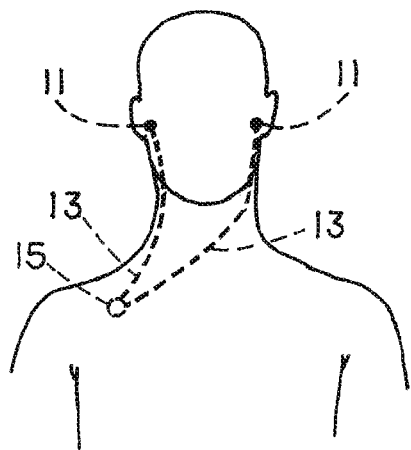
FIGS. 6 and 7 are front and side views respectively to show subcutaneous implants as in FIGS. 3-5 but with the implant itself connected via a longer subcutaneous wire to a second part of the implant located on the upper part of the chest.
Figure 7:
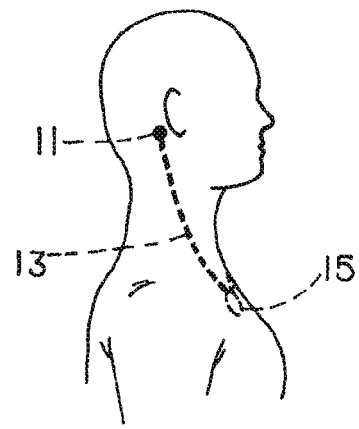
Figure 8:
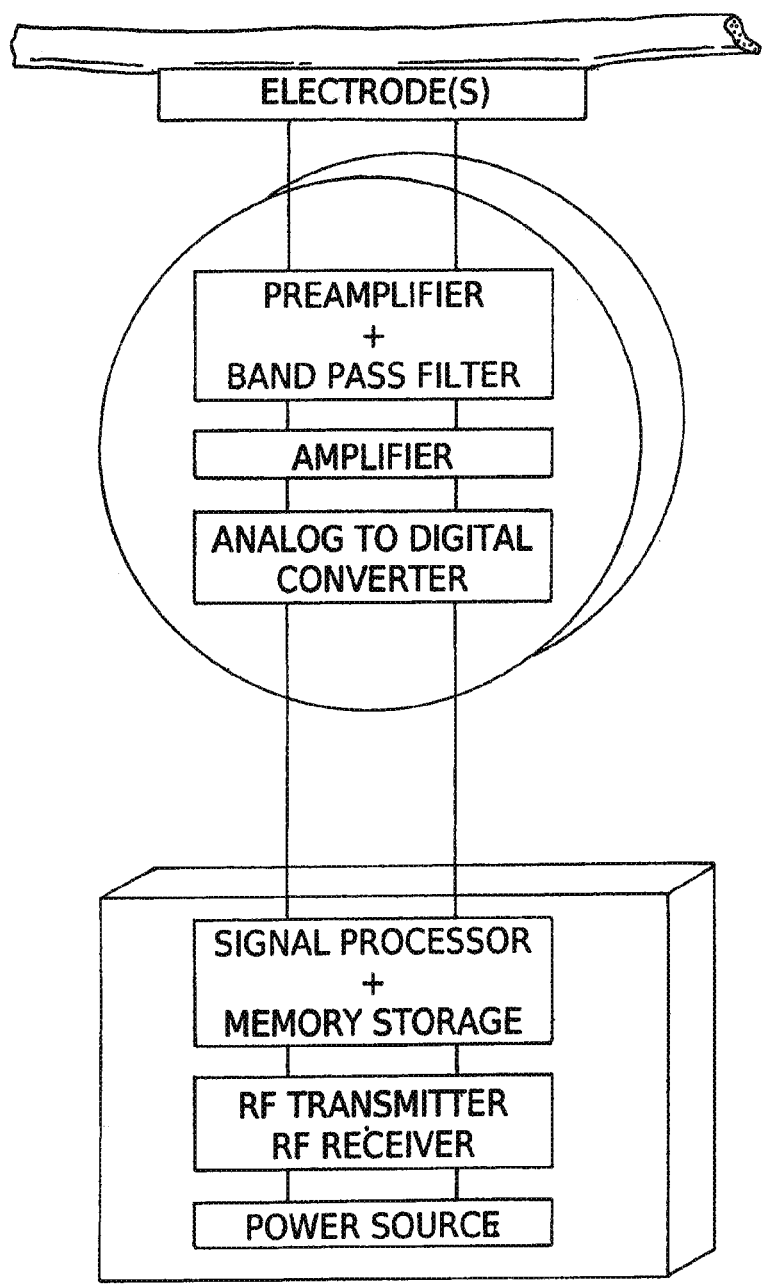
FIG. 8 is a more detailed diagram showing the arrangement of components as depicted in FIGS. 6 and 7 wherein smaller implants on each side are wired to a single secondary subcutaneous implant on the upper chest wall.

Each implanted or surface electrode has its own channel. As shown in FIGS. 2, 5 and 8, the signal processing circuitry of each channel for each electrode 11 or wearable surface electrode 43-46 described below preferably includes a pre-amplification process, band-pass filtering process, further amplification, and an analog-to-digital conversion process on each side of the head (FIGS. 3, 5B, 5C, 6, 7 and 8A). Other known signal processing mechanisms can be included to capture, optimize and transmit the signal in a way that maximizes the information contained in the desired signal while minimizing interference from unwanted nerve signals or other nearby structures. The signal processing steps are also preferably designed to minimize the electrical power required to process and transmit the signals.

The signal transmitting element of FIG. 2, 5 or 8 use a transmission modality that is generally compatible with current electronics and that has low power requirements. This modality is most preferably compatible with Bluetooth, but can include Wi-Fi or any RF transmission that would reliably carry sufficient information with minimal power requirements.

In the implanted embodiment, the power source or battery element can be a battery similar to that used in an implantable pacemaker, or most preferably be a smaller rechargeable lithium ion battery that would not require replacement. A rechargeable battery could be recharged with an induction coil or by any other method used to recharge implantable batteries.

While the implanted signal recording element 11 of FIG. 1 is in direct contact with the posterior auricular nerve and/or periauricular muscles, the signal processing, transmission and power elements can be located in a number of different places. Preferably all elements are implanted when an implanted electrode is used, but in some versions of this invention the processing and/or transmission and/or power element 15 is worn externally and communicate with the implanted element(s) 11 via the wires 13 or wireless RF transmission. In the first embodiment, in which all elements 11, 13 and 15 are implanted, the signal processing, transmission and/or power elements are contained in the same housing as the signal recording element can be mounted nearby on the mastoid bone or cranium, or could be implanted under the clavicle or in the chest wall in a fashion similar to an implantable pacemaker. Some embodiments also have elements 11, 13 and 15 in all of these places; for example, with the signal recording element placed on the nerve, the signal processing element mounted on the mastoid bone, and with the power and transmitter elements implanted subcutaneously in the chest wall.

The implanted elements 11 should be sealed in a biocompatible way, preferably with materials such as silicone or titanium, or any other material clinically proven to be safe for housing implants.

Figure 8A:
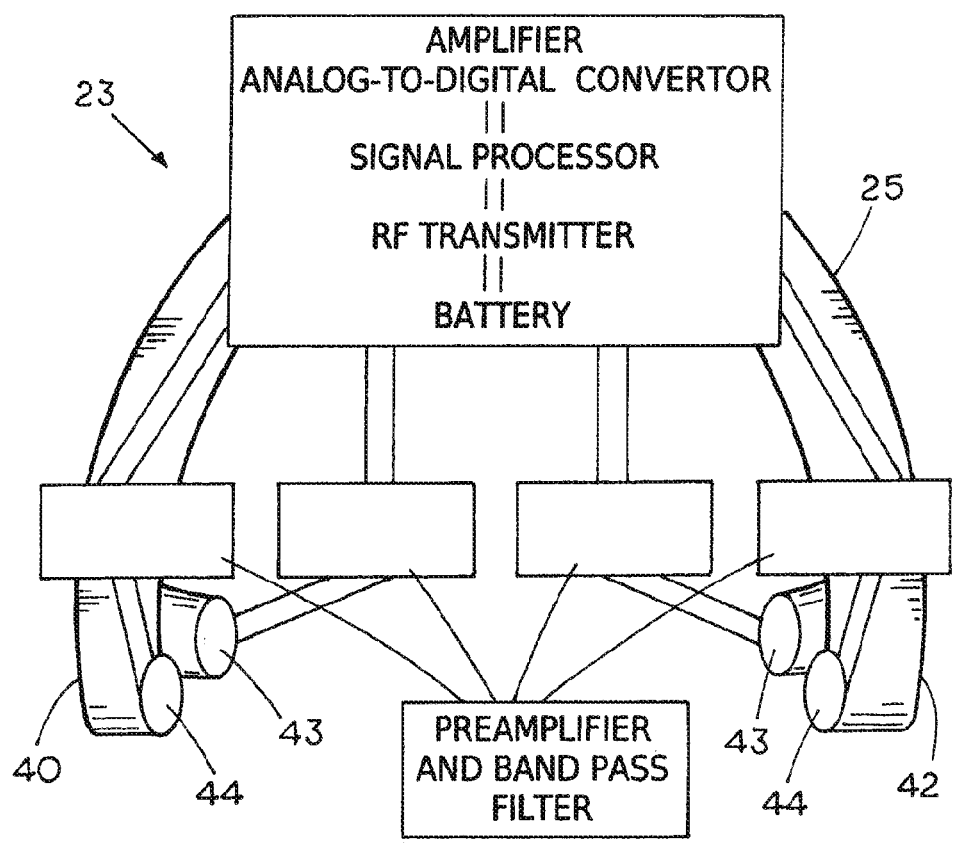
FIG. 8A is a more detailed diagram of the wearable headset with two sensor electrodes arranged bilaterally on each side of the head showing the arrangements of the components within the headset.

Refer now to FIGS. 5A and 5B which illustrate one preferred form of wearable electrode indicated at headset 23. It will be seen that there is a connecting resilient headband 25 that fits over the top of the head and on each side a relatively thin, flat bifurcated housing in a shape of an inverted U having anterior and posterior legs that fit anteriorly and posteriorly of the ear, respectively, and a rearwardly extending posterior projection 27. Thus each of the housings 40 and 42 support four EMG sensors comprising a sensor 44 positioned just anteriorly of the earlobe, a sensor 43 positioned just posteriorly to the external meatus and behind the earlobe, a sensor 45 positioned superior to the first two electrodes and intermediate them on a dorso-ventral line just beneath the top of the ear pinnae or pinnea as well as a fourth sensor 46 at the rear end of the dorsal projection 27. While the headset 23 can be formed from various materials, it is preferably formed from a non-conductive plastic resin such as lexan or nylon, as well as other plastic resins that will be apparent to those skilled in the art. It will also be seen that the vertical arms of each bifurcated earpiece 40 and 42 provide a failsafe way of correctly positioning the headset to locate the EMG sensors in place over the respective muscles. The invention thus provides four sensing or recording sites on each side of the head. As indicated in FIGS. 1A, 5A, 5B and 5C, each of the electrodes 43-46 is connected by electrical conductors first through a preamplifier and bandpass filter as shown in FIG. 8A and then to a signal processor in which the signal is passed in succession to an amplifier analog-to-digital converter, signal processor, RF transmitter and battery as shown in FIG. 8A to illustrate how each of the four separate signals from the sensors 43-46 on each side of the head is processed.

In the wearable embodiment, the headset 23 contains the electrodes and all of the electronics necessary to process, transmit and power the device without requiring that any element be implanted under the skin. The invention as shown in FIG. 5A is then worn in a manner similar to the way ordinary headphones are worn, with a strap 25 over the top of the head that connects to components around both ears and holds them in place. In other embodiments, each ear piece 40 and 42 is worn over each ear separately and is connected by a strap (not shown) around the back of the head for being incorporated into a hat or helmet, or alternatively around the ears in any of the other known ways that are commonly used to support headphones.

The wearable headset 23 receives bilateral signals, with each side of the device incorporating at least 1 EMG recording or sensing site, but it may incorporate up to 4 EMG recording sites 43, 44, 45 and 46 on each side (8 total inputs). The EMG recording sites in such an embodiment are placed over each of the 4 following muscles of the head as shown in FIG. 1A; the anterior auricularis muscle, superior auricularis muscle, posterior auricularis muscle, and occipitalis muscle. Other embodiments of the device could include recording sites over any combination of the 4 above mentioned muscles, from 1-4 sites on each side of the headset 25.

Referring to FIGS. 5C and 1A it can be seen that the headset places surfaces of EMG electrodes 43 and 45 over two muscles on each side of the head so as to provide a total of four distinct inputs consisting of the right and left superior auricularis muscles and the right and left posterior auricularis muscles.

It will be understood that in the case of the implantable sensors, the electrodes 11 sense signals directly from the efferent nerves that control the periauricular muscles or from the periauricular muscles themselves. In the wearable electrodes 43-46, on the other hand, no surgery is used. Instead, the headset 23 picks up surface EMG signals on the skin that arise over the periauricular muscles since the surface EMG signals can be detected non-invasively on the surface of the skin. Nerve signals themselves, however, are too small to be picked up from the skin but after being, in effect, amplified in the muscles they can be sensed through the skin by the wearable electrodes 43-46. The implanted sensors have much superior susceptibility to interference than skin surface electrodes and are less obtrusive since they provide a stronger signal and since they are hidden. The wearable sensors, however, are less expensive, more accessible to many users and do not require the trauma or expense associated with surgical implantation.

The electronics for signal processing and signal transmission can be incorporated into both earpieces 40 and 42, allowing each to act independently, or, in the preferred method where both sides communicate wirelessly or via wires, a single set of processing, power source and transmission components can be shared by both sides if desired. The shared electronics could be all concentrated on one earpiece, be distributed between the two pieces, or built into the part of the device that connects the two ear pieces 40 and 42.

Possible surface electrodes 43-46 include disposable surface electrodes, cup electrodes, bar electrodes, needle electrodes, pointed electrodes, or any of the types used for EMG measuring. In the preferred embodiment, the EMG electrodes are differential surface electrodes built permanently into the device and are of the "dry" type that does not require gel, but other embodiments could require the use of conductive gels or disposable electrode elements.

Some embodiments of the wearable headset may include buttons, switches, dials and other mechanisms on the device that will allow the user or the user's caregiver to activate/deactivate the device, adjust the device, or otherwise control it. Some embodiments of the invention allow the user to control the device by way of signals generated by the device itself. Such device control signals can be used directly adjust the device, or could do so by way of a "control panel" the user can access via computer interface.

Other embodiments of the invention can include a mechanism for the user to receive direct feedback from the implant or wearable device. This feedback mechanism is useful in situations when the user needs to know that the battery is running low, the device has just been turned on/off or any other situation where getting immediate feedback from the device will enhance the user's ability to use it. This feedback can be an auditory signal produced near the ear, it can be a vibratory signal produced by an element of the device that is in contact with bone or some other type of signal perceptible to user. The signal processing circuitry may also incorporate a microprocessor programmed to implement a learning function whereby the responsiveness of the system improves over time.

Figure 9:
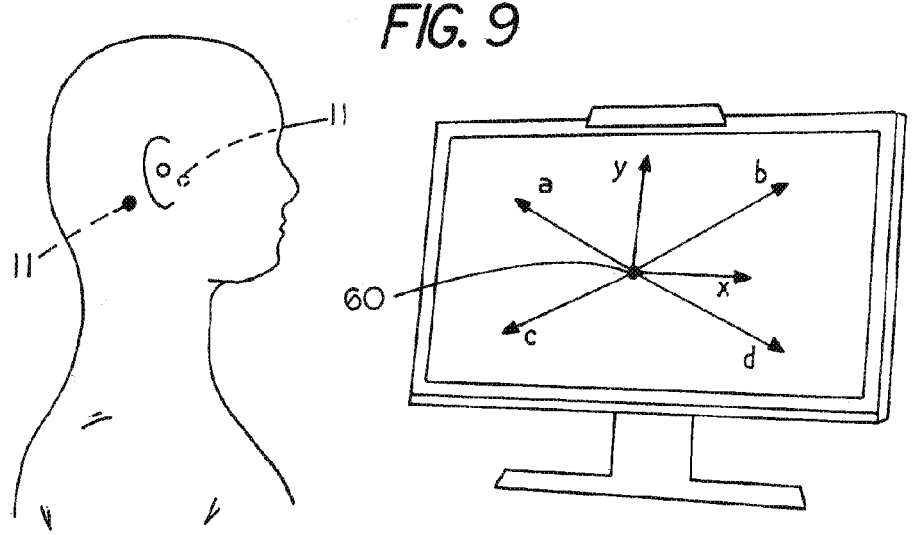
FIG. 9 is a diagrammatic perspective view to show how a person can actuate or move a virtual output element in more than one dimension.

The control of the motion and direction of motion of a real or virtual output device will now be described. The signals from the headset 23 or implant 11 may direct the real or virtual motion of an output device in either a manner that is rule based or in a manner that adapts to the individual user. In a rule based system, for example in FIG. 9, a cursor 60 is moved across a 2-D space represented by ordinates "x" and "y" with inputs from the bilateral superior auricularis muscles and bilateral posterior auricularis muscles, with EMG voltages from each muscle representing a force vector, e.g. "d" in the 2-D space. The right-sided muscles are used to form a right sided vector component, and the superior muscles are used to form an upwards vector component, with the left and inferior muscles containing vector components in the opposite directions. Such rules would be modified for embodiments of the device that have only one electrode on each side or have greater than two electrodes on each side. Such rules would also be modified when controlling a 1-D output device and when controlling a 3-D output device. FIG. 9 shows how in accordance with the invention an individual is able to direct cursor 60 across a 2-D computer screen with a rule based system where the vectors a, b, c and d correlate respectively with the left superior auricularis muscle (a), the right superior auricularis muscle (b), the left posterior auricularis muscle (c), and the right posterior auricularis muscle (d).

In another embodiment, the individual is told to move the cursor 60 in an intuitive manner while the system records the pattern of signals that represent each direction of motion. In this way, the system calibrates and adapts to each individual user, allowing for natural differences between individuals and provides a specialized control algorithm that is unique for every user.

Figure 10:
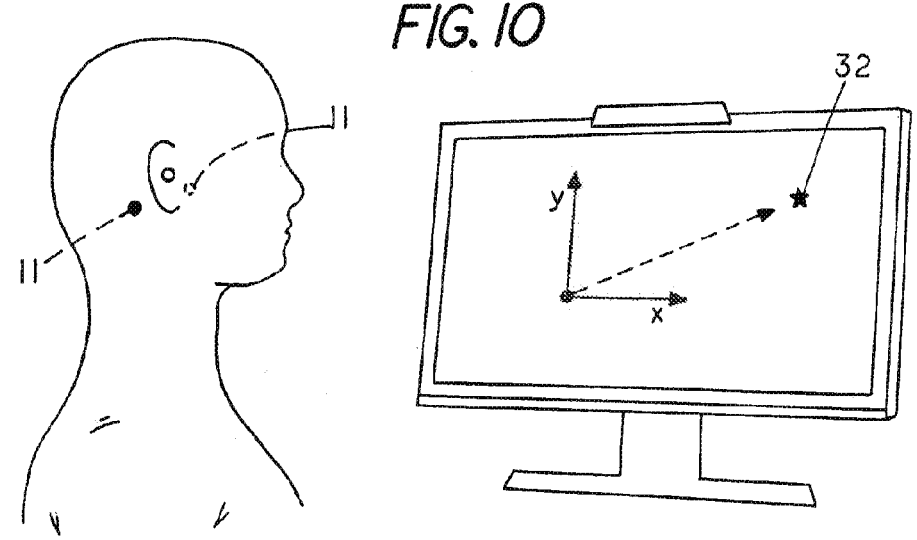
FIG. 10 is similar to FIG. 9 but shows how a person can move a cursor toward a particular target.

FIG. 10 illustrates another example of the invention in which the pattern of signals produced in the implanted sensor electrodes 11 moves a computer cursor 60 in a virtual 2-D environment towards an intended target 32 by extracting signal power and signal frequency information from each sensing electrode. Information regarding the power of the EMG or ENG signal can be calculated by using a root mean squared (RMS) voltage calculation, a rectified voltage calculation, or by any other means to extract power information from the biosignal. Frequency information can be extracted from the biosignal by applying a fast fourier transform (FFT) to the signal, or by other suitable known means applied to biosignals to characterize their frequencies. Information regarding the power and frequency characteristics of the signals from each electrode is then calculated and compared to these power and frequency characteristics from the other channels to determine which channel is being preferentially activated. The movement of the cursor 60 is thereby regulated or influenced by the relative contributions from each biosignal to reach the selected target.

Many variations of the present invention within the scope of the appended claims will be apparent to those in the art once the principles described herein are read and understood.

What is claimed is:

1. An apparatus adapted to be attached to a person for enabling a person to control the real or virtual action or movement of an output device to perform spatially oriented tasks in at least one dimension comprising:
    at least a pair of electrical sensors adapted to be located bilaterally such that at least one such sensor is thereby, adapted to be positioned on each side of the person's head in electrical communication with a vestigial periauricular nerve or muscle;
    said sensors being coupled through at least two communication channels and being mounted on a wearable head-supported structure to provide information to an output device from the sensors designating a real or virtual target location,
    signal processing, signal transmission and power elements wired to the sensors,
    wherein the signal processing, signal transmission and power elements are mounted on a structure that is adapted to be supported by the person using the apparatus and including an amplifier, filter, analog-to-digital converter and radio frequency transmitter connected to transmit the information arising from each side of the head to a receiver that actuates the output device, and
    the receiver being arranged for receiving the information from each such sensor to activate the output device or direct real or virtual motion of the output device in the direction of the target location or to the target location through real or virtual space which thereby allows the person freedom of movement while providing hands-free operation responsive to signals that arise from different periauricular nerves or muscles.

2. The apparatus of claim 1 including bilateral sensing wherein said sensor comprises at least one electrical sensor adapted to be supported on each side of the person's head in electrical skin contact communication with one vestigial periauricular nerve or muscle.

3. The apparatus of claim 1 including a member on the wearable head-supported structure, said head-supported structure having an element positioned to be located superiorly of the ear of the user and another element positioned to then be located posteriorly of the ear of the user with at least one sensor on each such element on at least one side of the head so as to be adapted to position the sensors to pick up electrical signals from two different periauricular nerves or muscles.

4. The apparatus of claim 1 wherein at least one of the sensor is adapted to be a surgically implanted electrode for being located under the skin of the person in electrical contact with a vestigial periauricular nerve or muscle that comprises at least one member selected from an anterior auricularis muscle, a superior auricularis muscle, a posterior auricularis muscle and an occipitalis muscle.

5. The apparatus of claim 1 wherein at least one sensor is a skin surface electrode that is adapted to be placed on the skin of the person and connected to sense signal power and signal frequency of an EMG signal from a vestigial periauricular muscle to activate the output device or direct the output device toward or to the target location.

6. The apparatus of claim 1 wherein the output device is at least one actuator for assisting handicapped or able bodied persons with respect to at least one member selected from disability assistance, strength enhancement, sensor enhancement, computer or cursor manipulation, gaming device operation including a video game, the operation of an appliance, a vehicle and a robotic device in a hands-free manner.

7. The apparatus of claim 1 wherein each channel carries at least one wireless digital signal.

8. The apparatus of claim 1 including a headset having at least first and second spaced apart sensor support positions that have first and second sensors that are each adapted for placement proximate a different periauricular nerve or muscle.

9. The apparatus of claim 8 wherein the headset has at least one such sensor adapted to be located above the ear and at least one sensor adapted to be located behind or in front of the ear.

10. The apparatus of claim 1 including a wearable headset that includes multiple electrical sensors located on a left and right side thereof for placement on corresponding sides of the person's head, said sensors being adapted to be placed in electrical communication with at least one member selected from an anterior auricularis muscle, a superior auricularis muscle, a posterior auricularis muscle and an occipitalis muscle and a vestigial periauricular nerve.

11. The apparatus of claim 1 including a user supported feedback element for providing feedback from the apparatus to the user for enhancing a person's ability to use said apparatus.

12. The apparatus of claim 1 wherein the bilaterally located electrical sensors comprise at least one skin surface electrode adapted to be positioned above the ear over right and left superior auricularis muscles and at least one skin surface electrode adapted to be positioned behind the ear over the right and left posterior auricular muscles.

13. An apparatus adapted to be attached to a person for enabling a person to activate or control an output device in real or virtual space comprising:
   a support structure adapted for being mounted on a person's head having at least a pair of electrical sensors that are adapted to be located on the left side of a person's head and a pair of electrical sensors that are adapted to be located on the right side of a person's head in electrical communication with a vestigial periauricular nerve or muscle that comprises at least two members selected from an anterior auricularis nerve or muscle, a superior auricularis nerve or muscle, aposterior auricularis nerve or muscle and an occipitalis nerve or muscle and
   each of said sensors being coupled through a communication channel for providing information to a real or virtual output device to designate the position of a real or virtual target location in at least one dimension,
   signal processing, signal transmission and power elements wired to the sensors,
   wherein the signal processing, signal transmission and power elements are mounted on a structure that is adapted to be supported by the person using the apparatus and including an amplifier, filter, analog-to-digital converter and radio frequency transmitter connected to transmit the information from each side of the head to a receiver that actuates the output device, and
   the output device being operatively connected to the receiver to activate the output device or move the output device toward or to the target location responsive to signals that arise from different ones of said periauricular nerves or muscles to thereby perform a real or virtual spatially oriented function.

14. The apparatus of claim 13 wherein the sensor comprises a plurality of the sensors on each side of the head.

15. The apparatus of claim 13 wherein each sensor is adapted to be a surgically implanted electrode that is located on each side of the head under the skin in electrical contact with a vestigial periauricular nerve or muscle.

16. The apparatus of claim 13 wherein each of the sensors is a skin surface electrode that is placed adapted to be on the skin of the person for receiving EMG signals from a vestigial periauricular muscle.

17. The apparatus of claim 13 wherein the output device is at least one actuator for assisting handicapped or able bodied persons with respect to at least one member selected from disability assistance, strength enhancement, sensor enhancement, computer or cursor manipulation, gaming device operation including a video game, the operation of an appliance, a vehicle and a robotic device in a hands-free manner.

18. The apparatus of claim 13 wherein each channel carries at least one wireless digital signal.

19. A method adapted to enable a person to control an output device comprising:
   providing a support structure to be mounted on the head of a person for placing at least two electrical sensors on at least one side of the person's head in electrical communication wherein each of said sensors is in contact with a different vestigial periauricular nerve or muscle selected from an anterior auricularis muscle, a superior auricularis muscle, a posterior auricularis muscle and an occipitalis muscle and
   connecting said sensors for transmitting a signal to communicate information from each such sensor to a real or virtual output device for activating the output device or designating a position of a real or virtual target location,
   providing signal processing, signal transmission and power elements wired to the sensors,
   wherein the signal processing, signal transmission and power elements are mounted on a structure that is adapted to be supported by the person using the apparatus and including an amplifier, filter, analog-to-digital converter and radio frequency transmitter connected to transmit the information to a receiver that actuates the output device, and
   causing the output device to be thereby actuated or moved toward the target location or to the target location in real or virtual space responsive to signals that arise from different perauricular nerves or muscles.

20. The method of claim 19 and further including the step of providing bilateral sensing wherein at least one electrical sensor is placed on each side of a person's head in electrical communication with the vestigial periauricular nerve or muscle.

21. The method of claim 19 including the step of placing a plurality of the sensors on both sides of the head in electrical communication with a periauricular nerve or muscle.

22. The method of claim 19 including the step of surgically implanting each electrical sensor under the skin of the person in electrical contact with a vestigial periauricular nerve or muscle.

23. The method of claim 19 including the step of placing a skin surface electrode on the skin of the person for receiving EMG signals from a vestigial periauricular muscle.

24. The method of claim 19 including the step of providing as said output device an actuator to assist handicapped or able bodied persons with respect to a member selected from disability assistance, strength enhancement, sensor enhancement, computer or cursor manipulation, gaming device operation including a video game, the operation of an appliance, a vehicle and a robotic device in a hands-free manner.

25. The method of claim 19 wherein each channel carries a different wireless digital signal.

26. The method of claim 19 including the further steps of providing a headset having at least first and second spaced apart sensor support positions that each have at least one of said two electrical sensors,
   locating each of said two electrical sensors proximate different periauricular nerves or muscles, and
   transmitting signals from each of the sensors through separate channels of communication to the output device.

27. The method of claim 19 including the steps of providing a wearable headset constructed and arranged to receive bilateral signals from a person's head and adapted to locate the sensors in electrical communication on each side of the head with at least one member selected from an anterior auricularis muscle, a superior auricularis muscle, a posterior auricularis muscle and an occipitalis muscle and a vestigial periauricular nerve.

28. The method of claim 19 including the steps of extracting power information from at least one of the signals and extracting frequency information from at least one of the signals and using the power and frequency information for controlling the output device.

29. A method for enabling a person to control an output device comprising:
   providing a wearable head-supported structure adapted for placing at least one electrical sensor on the left side and at least one electrical sensor on the right side of a person's head in electrical contact with a vestigial periauricular nerve or muscle, mounting the head-supported structure on the person's head and connecting each sensor to communicate through at least two a communication channel for providing information to a moveable real or virtual output device to activate the device or designating the position of a real or virtual target location, providing signal processing, signal transmission and power elements that are wired to the sensors, wherein the signal processing, signal transmission and power elements are mounted on a structure that is adapted to be supported by the person using the apparatus, said elements including an amplifier, filter, analog-to-digital converter and radio frequency transmitter arranged to transmit the information from each side of the head to a receiver that actuates the output device, arranging the receiver so as to receive the information from each such sensor to thereby allow the person freedom of movement while providing hands-free operation, such that the output device performs an action or is moved to or toward the target location in real or virtual space responsive to signals that arise from different periauricular nerves or muscles.

30. The method of claim 29 including the step of placing a plurality of the sensors on each side of the head in electrical communication with a periauricular nerve or muscle.

31. The method of claim 29 including the step of surgically implanting each electrode under the skin of the person in electrical contact with a vestigial periauricular nerve or muscle.

32. The method of claim 29 wherein each of the sensors is a skin surface electrode and including the step of placing each skin surface electrode on the skin of the person for receiving EMG signals from a vestigial periauricular muscle.

33. The method of claim 29 including the step of operating the output device as an actuator to assist handicapped or able bodied persons with respect to a member selected from disability assistance, strength enhancement, sensor enhancement, computer or cursor manipulation, a gaming device including a video game, the operation of an appliance, a vehicle and a robotic device in a hands-free manner.

34. The method of claim 29 including the step of providing each channel with a different wireless digital signal.

35. The method of claim 29 including the steps of providing a wearable headset constructed and arranged to receive bilateral signals from the person's head and including multiple electrical sensors adapted to be positioned on the left side and multiple electrical sensors adapted to be positioned on the right side of the person's head in electrical contact with a member selected from an anterior auricularis muscle, a superior auricularis muscle, a posterior auricularis muscle and an occipitalis muscle.

36. An apparatus adapted to be implanted beneath the skin of a person for enabling the person to control the real or virtual action or movement of an output device to perform spatially oriented tasks in at least one dimension comprising:

at least a pair of separate electrical sensors for being located bilaterally and being constructed and arranged to be implanted beneath the skin on either side of the person's head in electrical communication with a vestigial periauricular nerve or muscle;

signal processing, signal transmission and power elements conductively connected to each sensor that includes an amplifier, a filter, an analog-to-digital converter and a radio frequency transmitter conductively connected thereto for being implanted with each such implanted electrical sensor to transmit information from the sensors to a receiver and the receiver being arranged for receiving the information from each such sensor to activate the output device or direct real or virtual motion of the output device in the direction of the target location or to the target location through real or virtual space, thereby allowing the person freedom of movement while providing hands-free operation of the apparatus responsive to subdermal electrical signals that arise from different periauricular nerves or muscles.

37. The apparatus of claim 36 wherein a plurality of the signal processing, signal transmission or power elements are contained in the same housing, which housing is adapted to be implanted beneath the skin of the person.

38. The apparatus of claim 36 wherein one or more of the signal processing, signal transmission or power element is adapted to be worn externally by the person and to communicate with at least one of the implanted electrical sensors via wires or wireless radio frequency transmission.

* * * * *